US012363400B2

(12) United States Patent
Li et al.

(10) Patent No.: US 12,363,400 B2
(45) Date of Patent: Jul. 15, 2025

(54) MULTIMEDIA INFORMATION PROCESSING METHOD AND APPARATUS, ELECTRONIC DEVICE AND STORAGE MEDIUM

(71) Applicant: Beijing Zitiao Network Technology Co., Ltd., Beijing (CN)

(72) Inventors: Yijie Li, Beijing (CN); Pingping Zhou, Beijing (CN); Xu Liu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/651,167

(22) Filed: Apr. 30, 2024

(65) Prior Publication Data

US 2024/0284016 A1  Aug. 22, 2024

Related U.S. Application Data

(63) Continuation of application No. PCT/CN2022/128904, filed on Nov. 1, 2022.

(30) Foreign Application Priority Data

Nov. 1, 2021 (CN) .......................... 202111284459.5

(51) Int. Cl.
*H04N 21/854* (2011.01)
*H04N 21/218* (2011.01)
(Continued)

(52) U.S. Cl.
CPC ....... *H04N 21/854* (2013.01); *H04N 21/2187* (2013.01); *H04N 21/235* (2013.01); *H04N 21/431* (2013.01)

(58) Field of Classification Search
CPC ............ H04N 21/854; H04N 21/2187; H04N 21/235; H04N 21/431
(Continued)

(56) References Cited

U.S. PATENT DOCUMENTS 9,106,720 B1 * 8/2015 Hunt .................. G06Q 30/0267
11,863,638 B1 * 1/2024 Mukherji .............. G06F 3/0482
(Continued)

FOREIGN PATENT DOCUMENTS

| CN | 106792081 A | 5/2017 |
|---|---|---|
| CN | 106937130 A | 7/2017 |

(Continued)

OTHER PUBLICATIONS

International Patent Application No. PCT/CN2022/128904; Int'l Written Opinion and Search Report; dated Dec. 29, 2022; 8 pages.
(Continued)

*Primary Examiner* — Dominic D Saltarelli
(74) *Attorney, Agent, or Firm* — BakerHostetler

(57) ABSTRACT

Disclosed in the embodiments of the present disclosure are a multimedia information processing method and apparatus, an electronic device and a storage medium. The multimedia information processing method includes identifying a type of a live channel; generating, according to the type of the live channel, first multimedia information corresponding to the live channel; and sending the first multimedia information to a client, so that a first page, which is displayed by the client after a live of the live channel ends, comprises the first multimedia information.

20 Claims, 11 Drawing Sheets

(51) Int. Cl.
*H04N 21/2187* (2011.01)
*H04N 21/235* (2011.01)
*H04N 21/431* (2011.01)

(58) Field of Classification Search
USPC .......................................................... 725/37
See application file for complete search history.

(56) References Cited

U.S. PATENT DOCUMENTS

| | | | |
|---|---|---|---|
| 2003/0084449 | A1 | 5/2003 | Chane et al. |
| 2018/0053217 | A1* | 2/2018 | Yamagishi ......... G06Q 30/0267 |
| 2019/0182514 | A1 | 6/2019 | Zhang et al. |
| 2019/0268661 | A1* | 8/2019 | Park ................... H04N 21/4668 |
| 2021/0314639 | A1* | 10/2021 | Li ..................... H04N 21/26603 |

FOREIGN PATENT DOCUMENTS

| | | |
|---|---|---|
| CN | 108668143 A | 10/2018 |
| CN | 109688418 A | 4/2019 |
| CN | 306004198 S | 8/2020 |
| CN | 111782101 A | 10/2020 |
| CN | 111866528 A | 10/2020 |
| CN | 112330350 A | 2/2021 |
| CN | 112911320 A | 6/2021 |
| CN | 113315989 A | 8/2021 |
| CN | 113343055 A | 9/2021 |
| CN | 113992934 A | 1/2022 |
| JP | 2006-314073 A | 11/2006 |
| WO | WO 2014/021915 A1 | 2/2014 |
| WO | WO 2017/076315 A1 | 5/2017 |

OTHER PUBLICATIONS

L. Fengnian; "Design and Implementation of the Client of Live Cellphone News"; Journal of Anhui Vocational College of Electronics & Information Technology; No. 95 vol. 17; Feb. 2018; p. 9-13 (contains English Abstract).

Jung et al.; "Switched Digital Video Using Convergence Transmission of Broadcasting and Communication on Cable TV Network"; 21st Asia-Pacific Network Operations and Management Symposium; Oct. 2020; 2 pages.

* cited by examiner

MULTIMEDIA INFORMATION PROCESSING METHOD AND APPARATUS, ELECTRONIC DEVICE AND STORAGE MEDIUM

CROSS-REFERENCE TO RELATED APPLICATIONS

The present application is a continuation of International Application No. PCT/CN2022/128904, filed on Nov. 1, 2022, which claims the priority to the Chinese Patent application No. 202111284459.5 filed on Nov. 1, 2021, both of which are incorporated by reference herein in their entireties.

TECHNICAL FIELD

The present disclosure relates to the field of information technology, and in particular, to a multimedia information processing method and apparatus, an electronic device and a storage medium.

BACKGROUND

With the continuous development of information technology, people can view live videos through various social platforms to make communication and interaction.

For example, a user can view a live video through a social platform, and after the live ends, a live end page will be displayed, in which information such as duration of the live or number of viewers generally will be displayed, as a consequence, the display content is simple, and user feeling and experience is poor.

SUMMARY

In order to solve the above technical problems or at least partially solve them, embodiments of the present disclosure provide a multimedia information processing method and apparatus, an electronic device and a storage medium.

An embodiment of the present disclosure provides a multimedia information processing method, comprising:
  identifying a type of a live channel;
  generating, according to the type of the live channel, first multimedia information corresponding to the live channel; and
  sending the first multimedia information to a client, so that a first page, which is displayed by the client upon an end of a live of the live channel, comprises the first multimedia information.

An embodiment of the present disclosure further provides a multimedia information processing apparatus, comprising:
  an identifying unit configured to identify a type of a live channel;
  a generating unit configured to generate, according to the type of the live channel, first multimedia information corresponding to the live channel; and
  a display unit configured to send the first multimedia information to a client, so that a first page, which is displayed by the client upon an end of a live of the live channel, comprises the first multimedia information.

An embodiment of the present disclosure further provides an electronic device, comprising:
  one or more processors; and
  storage means configured to store one or more programs;
  the one or more programs, when executed by the one or more processors, causing the one or more processors to implement the multimedia information processing method as described above.

An embodiment of the present disclosure further provides a computer-readable storage medium having thereon stored a computer program which, when executed by a processor, implements the multimedia information processing method as described above.

An embodiment of the present disclosure further provides a computer program product comprising a computer program or instructions which, when executed by a processor, implement the multimedia information processing method as described above.

BRIEF DESCRIPTION OF THE DRAWINGS

The above and other features, advantages, and aspects of the embodiments of the present disclosure will become more apparent in conjunction with the accompanying drawings and with reference to the following DETAILED DESCRIPTION. Throughout the drawings, the same or similar reference numbers refer to the same or similar elements. It should be understood that the drawings are schematic and components and elements are not necessarily drawn to scale.

DETAILED DESCRIPTION

Figure 1:
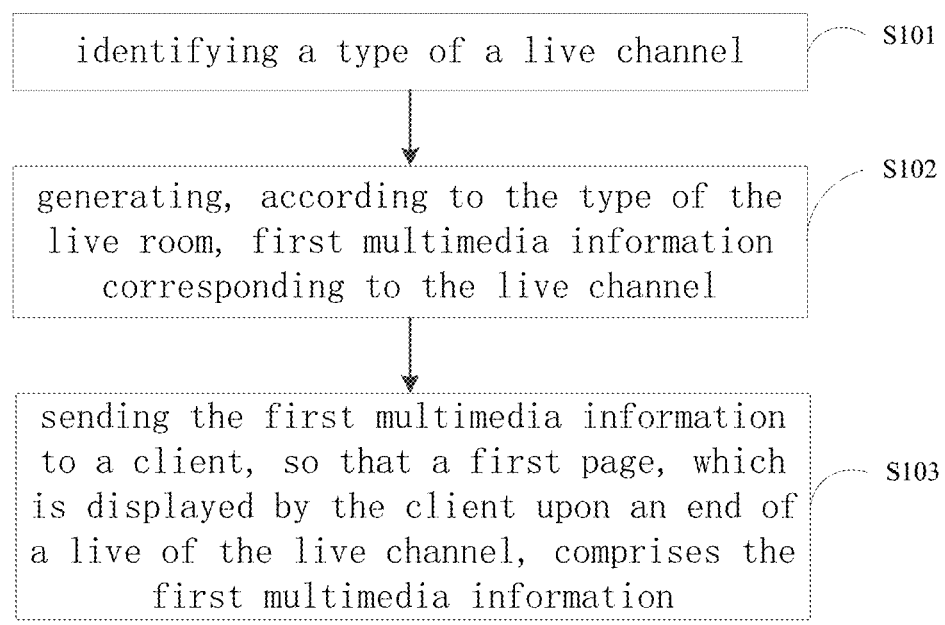
FIG. 1 is a flow diagram of a multimedia information processing method in an embodiment of the present disclosure.

The embodiments of the present disclosure will be described in more detail below with reference to the accompanying drawings. While certain embodiments of the present disclosure are shown in the drawings, it should be understood that the present disclosure may be implemented in various forms and should not be construed as limited to the embodiments set forth herein, which, however, are provided for a more complete and thorough understanding of the present disclosure instead. It should be understood that the drawings and the embodiments of the present disclosure are for exemplary purposes only and are not intended to limit the scope of protection of the present disclosure.

It should be understood that various steps recited in method implementations of the present disclosure may be performed in a different order, and/or performed in parallel. Furthermore, the method implementations may include additional steps and/or omit the illustrated steps. The scope of the present disclosure is not limited in this respect.

The term "comprising" and variations thereof used herein are intended to be open-minded, i.e., "comprising but not limited to". The term "based on" is "at least partially based on".

The term "one embodiment" means "at least one embodiment"; the term "another embodiment" means "at least one other embodiment"; and the term "some embodiments" means "at least some embodiments". Definitions related to other terms will be given in the following description.

It should be noted that the terms "first", "second", and the like mentioned in the present disclosure are only used for distinguishing different devices, modules or units, and are not used for limiting the order or interdependence of the functions performed by the devices, modules or units.

It should be noted that modifications of "a" or "a plurality" mentioned in this disclosure are intended to be illustrative rather than restrictive, and that those skilled in the art should appreciate that they should be understood as "one or more" unless otherwise explicitly stated in the context.

Names of messages or information exchanged between a plurality of devices in the implementations of the present disclosure are for illustrative purposes only, and are not intended to limit the scope of the messages or information.

FIG. 1 is a flow diagram of a multimedia information processing method in an embodiment of the present disclosure. The embodiment is applicable to a case of performing multimedia information processing in a client, and the method may be performed by a multimedia information processing apparatus, which may be implemented in software and/or hardware, and may be configured in an electronic device, such as a terminal, specifically comprising but not limited to a smartphone, a personal digital assistant, a tablet computer, a wearable device with a display screen, a desktop computer, a notebook computer, an all-in-one computer, a smart home device, and the like. Alternatively, the embodiment is applicable to a case of performing multimedia information processing in a server, and the method may be performed by a multimedia information processing apparatus, which may be implemented in software and/or hardware, and may be configured in an electronic device, such as a server.

As shown in FIG. 1, the method may specifically comprise:

S101, identifying a type of a live channel (also referred to live room). The live channel is a channel, through which users can display live content, watch live content, perform live interaction and so on.

Figure 2:
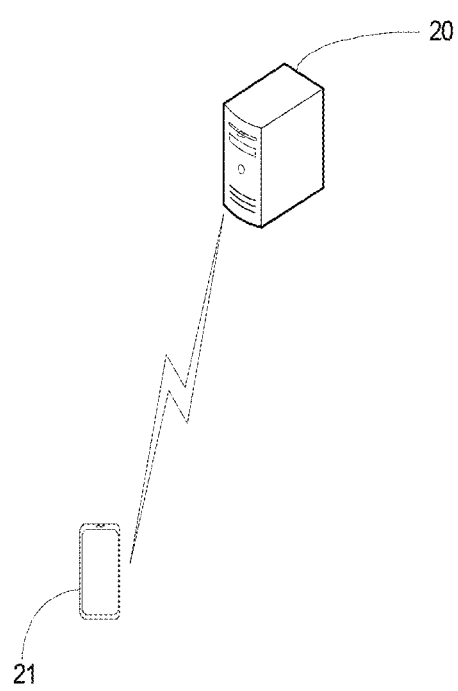
FIG. 2 is a schematic diagram of an application scenario in an embodiment of the present disclosure.

As shown in FIG. 2, a terminal 21 communicates with a server 20. In some embodiments, the terminal 21 has an application (APP) installed thereon, and the server 20 may be a server corresponding to the APP. That is, the server 20 may provide an application service to a user of the terminal through the APP. It can be understood that the application scenario shown in FIG. 2 is only an illustration and does not make specific limitations. In addition, this embodiment does not specifically limit the APP either, for example, the APP may be an APP having a function of viewing a live video. Understandably, the multimedia information processing method can be applied in the server 20, and the client below can specifically refer to the terminal 21.

Optionally, the above S101 specifically comprises: obtaining a label corresponding to the live channel; and determining the type of the live channel according to the label corresponding to the live channel.

Understandably, the server 20 may obtain a label corresponding to the live channel and determine the type of the live channel according to the label corresponding to the live channel, and one type of the live channel might comprise multiple types of labels. For example, the label corresponding to the live channel may be hot spot operation, program, e-commerce, trailer, payment or other basic labels, etc.

Optionally, the type of the live channel comprises a recommendation-type live channel, a guidance-type live channel, and a basic-type live channel.

Understandably, the type of the live channel can be determined according to the label defined for the live channel. In some embodiments, live channels whose live channel labels are program, hot spot operation or e-commerce are classified into recommendation-type live channels, where media content such as program content, hot spot content, and commodity (physical or virtual commodity) is recommended; live channels whose live channel labels are trailer or payment are classified into guidance-type live channels, where the terminal user can be guided to subscribe to content or generate a replay video, etc.; and live channels whose live channel labels are basic labels are classified into basic-type live channels. The basic-type live channel is, for example, a pan-entertainment (talk show, dance performance) live channel. The basic-type live channel may be understood as a live channel other than the recommendation-type and guidance-type ones described above; and one or more live channels can also be circled in a same label, and the circled one or more live channels are classified into one type.

The method further comprises a step of S102, generating, according to the type of the live channel, first multimedia information corresponding to the live channel.

Understandably, at least one standard or template for generating the first multimedia information can be preconfigured for each type of live channel, and according to the identified type of the live channel, the first multimedia information is generated from the live content following the generation standard or template, that is, the first multimedia information correspondingly generated for different types of live channels is different. It can be understood that the multimedia information is not limited to image information and video information, and may also comprise, for example, text information, audio information, or combination information of at least two of the text information, the audio information, the image information, or the video information.

Optionally, the first multimedia information comprises at least one of recommendation information, guidance information, or prompt information, wherein the recommendation information comprises image, title, and recommendation identification, and the guidance information comprises video, image, and guidance identification.

Understandably, the recommendation information specifically refers to content customized according to the live channel, which may comprise image, title and recommendation identification, and the guidance information specifically refers to video and the like related to the live content of the live channel, which specifically comprises video, image and guidance identification. The guidance information may be information for guiding the terminal user to view a trailer video or replay video, the recommendation information may be information for recommending a target object, wherein the target object may be a commodity or the like, and the prompt information may be information for prompting live details, such as the number of viewers of the live.

The method further comprises a step of S103, sending the first multimedia information to a client, so that a first page, which is displayed by the client upon an end of a live of the live channel, comprises the first multimedia information.

Understandably, on the basis of the above S102, the server 20 sends the generated first multimedia information to the client (terminal 21), and the terminal 21 receives the first multimedia information and displays the first multimedia information on the displayed first page when the live ends.

Figure 3:
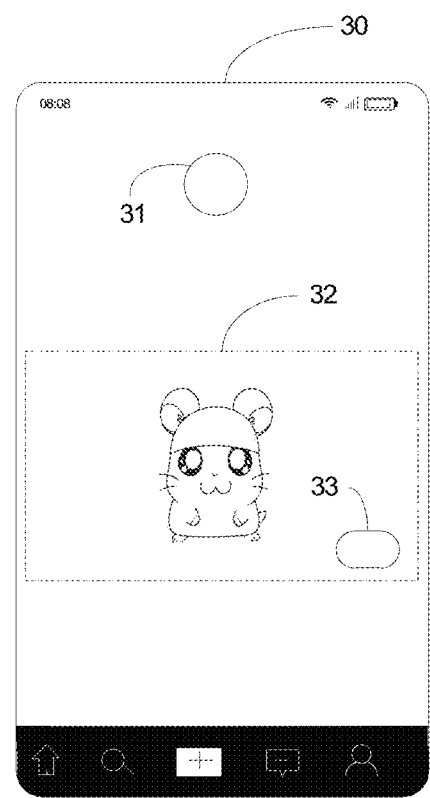
FIG. 3 is a schematic diagram of a user page in an embodiment of the present disclosure.
Figure 4:
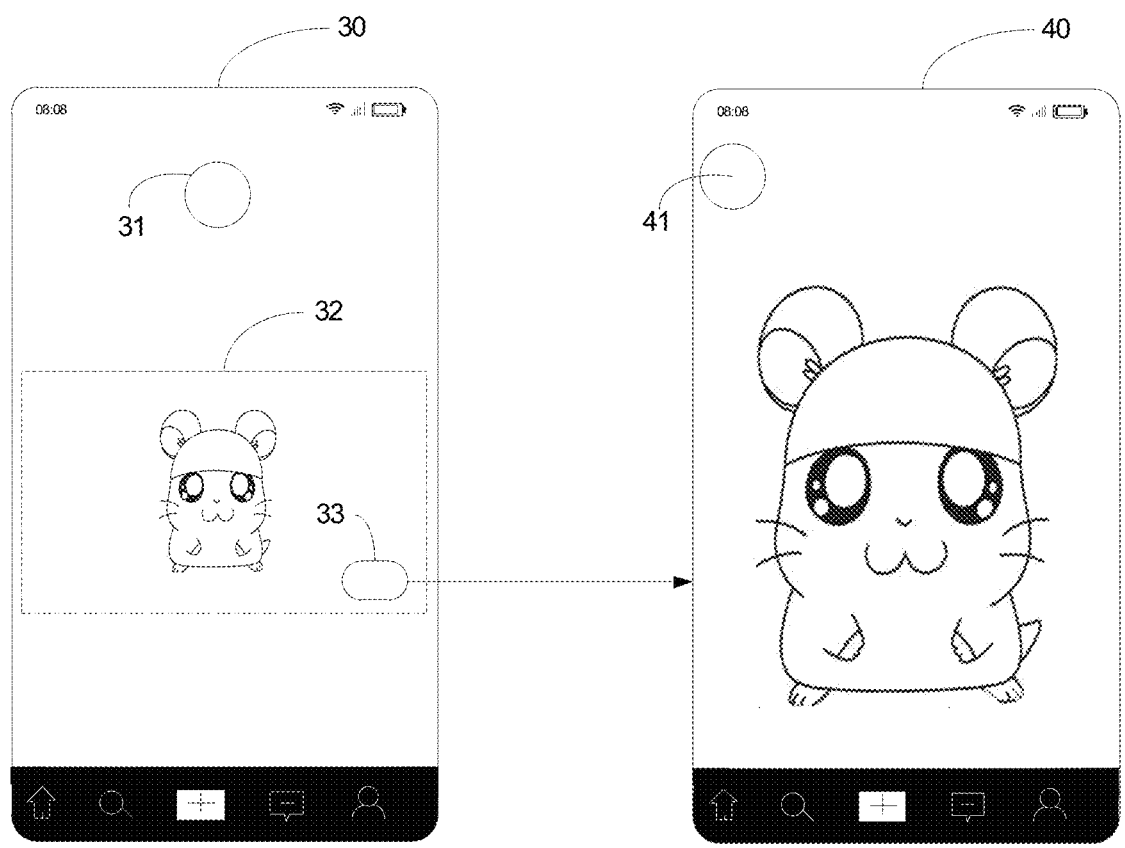
FIG. 4 is a schematic diagram of another user page in an embodiment of the present disclosure.

In this embodiment, a schematic description is made by taking a user page of the terminal 21 as an example, for example, a user page shown in FIG. 3 is a schematic diagram of the user page of the terminal 21. As shown in FIG. 3, the user page 30 may be denoted as a first page, and the first page 30 may be a live end page displayed when the live played by the APP as described above ends; the first page may appear in two cases: in a first case, the user is in a live stream, and when the user swipes up and down for switching between live channels, he/she just right switches to a live channel whose live ends, and the first page appears; and in a second case, when a live of a live channel being viewed by the user ends, the first page appears; in the two cases described above, the terminal 21 is caused to display the first page 30, wherein the live stream refers to a multi-card aggregation feed stream. As shown in FIG. 3, the first page 30 comprises an identification 31 corresponding to an anchor, first multimedia information 32, and an identification 33 in the first multimedia information, wherein the identification in the first multimedia information may be denoted as a first identification, the first identification may specifically be the above recommendation identification or guidance identification, and the anchor refers to a user playing live video information. The identification 31 corresponding to the anchor may display basic information of the anchor, such as an avatar and name of the anchor, and if the user does not follow the anchor, a follow identification may also be displayed, so that when the terminal 21 detects a trigger operation for the follow identification, the terminal 21 may add the anchor into a follow list of the user which is recorded by the terminal 21; when the terminal 21 detects a trigger operation for the first identification 33, the terminal 21 may switch the first page 30 displayed in a display component to a third page 40 as shown in FIG. 4. The third page 40 may specifically be a display page of the first multimedia information, for example, the first multimedia information may comprise title, video, image, and external link; when the first multimedia information comprises video, the third page 40 may play the video; when the first multimedia information comprises an image, the third page 40 may play the image, and the image may be a dynamic or static one; the third page 40 may further comprise an identification 41 corresponding to the anchor, for displaying the basic information of the anchor. In this embodiment, the trigger operation may not be limited to click, double click, swipe, long press, voice control, gesture control, expression control, and the like. The display component may specifically comprise a display screen, a touch screen, and other components or modules having a display function.

For example, when the terminal 21 detects a trigger operation for the first identification, the terminal 21 may display the first multimedia information. It can be understood that the trigger operation for the first identification may be performed by the user of the terminal 21, or may be performed by a user on the terminal 21, whose family or friend etc. desires to view the first multimedia information on the terminal 21.

Optionally, after the first page is displayed, the trigger operation for the first identification is detected and the third page is displayed, the third page being used for displaying the first multimedia information.

Understandably, if detecting the trigger operation for the first identification, the terminal 21 may directly display the third page, the third page being used for displaying the first multimedia information.

Optionally, the third page further comprises a second identification, the second identification being associated with the first page; after displaying the third page, the method further comprises: detecting a trigger operation for the second identification, and displaying the first page.

Understandably, the third page further comprises the second identification, wherein a display position and a display state of the second identification in the third page are not limited, for example, the second identification may be hidden in a preset area in the third page, and may also be directly displayed in the third page; and the second identification may be understood as a return identification, and after detecting the trigger operation for the second identification, the terminal redisplays the first page, that is, after the live end page jumps, the terminal can also return to the live end page.

Figure 5:
FIG. 5 is a schematic diagram of another user page in an embodiment of the present disclosure.

For example, referring to a third page 50 shown in FIG. 5, the third page 50 may be displayed after the terminal 21 detects the trigger operation for the first identification 33 in the first page 30. The third page 50 comprises an identification 51 corresponding to the anchor and a second identification 52, and a word "return" or a return icon may be displayed in the second identification 51, so that when the terminal 21 detects a trigger operation for the second identification 52, the terminal 21 displays the first page 30, that is, returns to the first page 30, completing the operation process of jumping from the first page 30 to the first page 50 and returning to the first page 30.

Understandably, the first page may comprise at least one of an anchor information area, a display content area, or a recommendation area, wherein the anchor information area is used for displaying the information of the anchor, the display content area is used for displaying the first multimedia information, and the recommendation area is used for displaying recommended live information, and a layout of the first page may be self-determined, wherein the first multimedia information may be displayed in the display content area.

Optionally, when the type of the live channel is the recommendation-type live channel, the first multimedia information comprises the recommendation information and/or the prompt information; when the type of the live channel is the guidance-type live channel, the first multimedia information comprises the guidance information and/or the prompt information; when the type of the live channel is the basic-type live channel, the first multimedia information comprises the prompt information.

Figure 6:
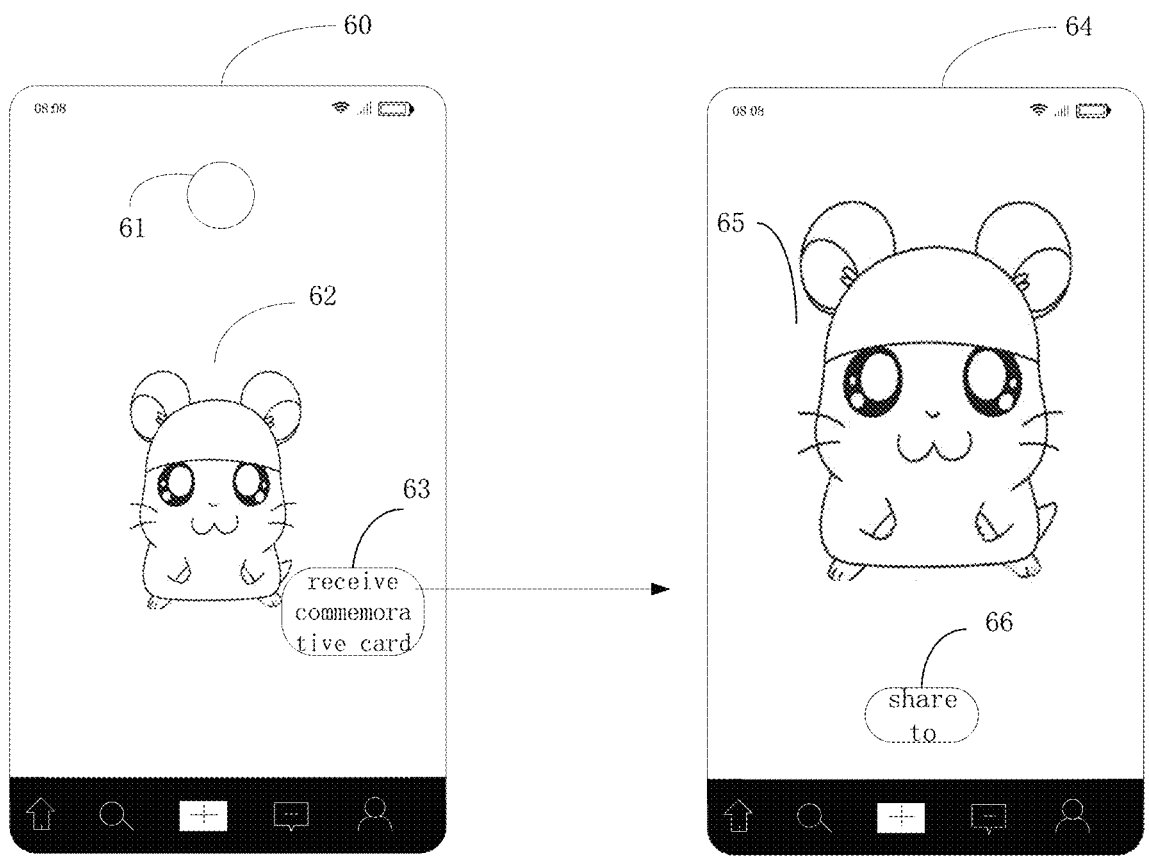
FIG. 6 is a schematic diagram of another user page in an embodiment of the present disclosure.

Understandably, when the server 20 determines that the type of the live multimedia information is the recommendation-type live channel, for example, when the live channel is a hot spot operation live channel, the first multimedia information comprising the recommendation information and/or the prompt information may be generated, wherein the recommendation information may be a commemorative picture corresponding to the hot spot operation live channel, the commemorative picture may be a static or dynamic picture related to a live theme, or a picture preset by the anchor, or a picture obtained by extracting frames from the live multimedia information, or a picture captured by dynamic highlight in the live process, and the prompt information may be basic information such as the number of viewers in the hot spot operation live channel. For example, when the server 20 sends the first multimedia information to the terminal 21, a first page 60 shown in FIG. 6 is displayed in the terminal 21 when the live ends, the first page 60 comprising an identification 61 corresponding to the anchor, first multimedia information 62, and a first identification 63, wherein the first identification 63 at this time specifically refers to a recommendation identification, in which information related to the live theme may be displayed, for example, text information such as "receive commemorative card"; the first multimedia information 62 may also comprise copywriting related to the live theme and/or comprising key data, or a blessing word comprising thanks, which is not limited herein. After detecting a trigger operation for the first identification 63, the terminal 21 displays a third page 64, in which a generated commemorative picture 65 and a share identification 66 may be displayed, wherein the generated commemorative picture 65 comprises the above commemorative picture, information related to the user, and the like, and the share identification 66 is used for storing, sharing etc. the generated commemorative picture 65, so that the generated commemorative picture 65 may also be understood as a picture customized by the user.

Figure 7:
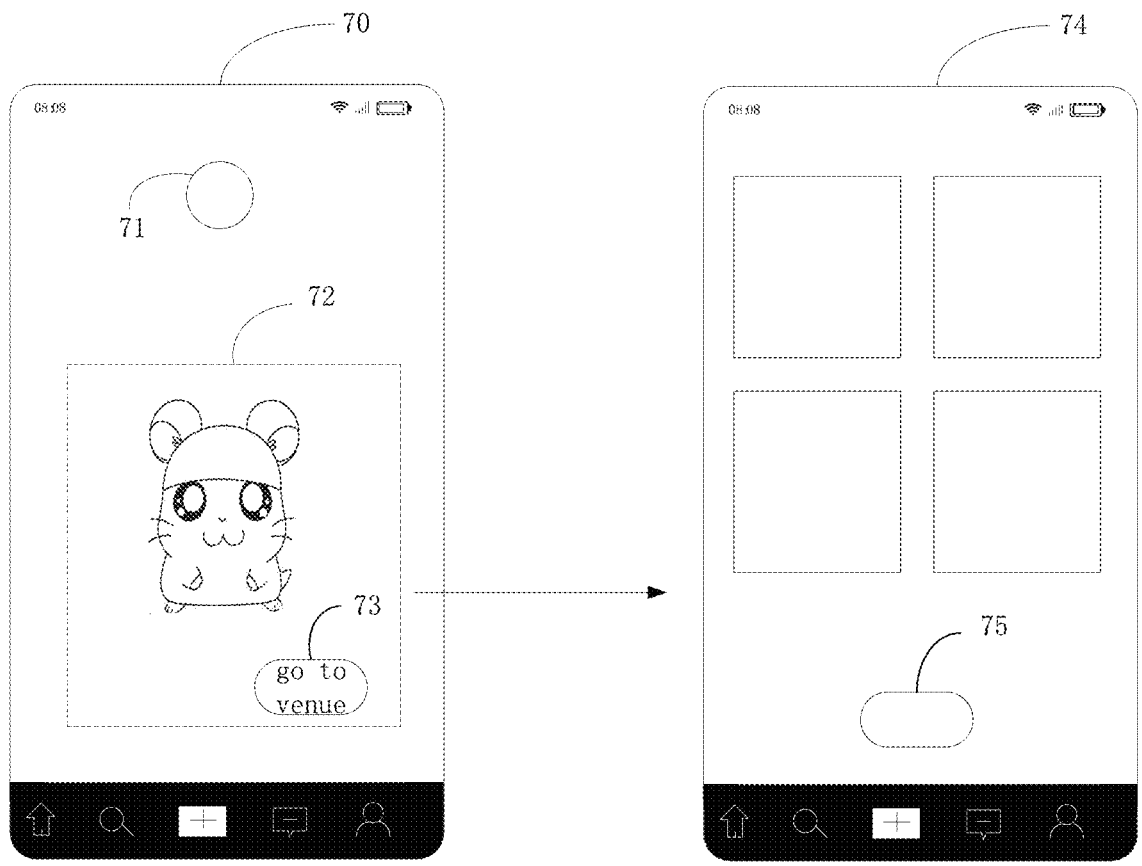
FIG. 7 is a schematic diagram of another user page in an embodiment of the present disclosure.

Understandably, when the server 20 determines that the type of the live multimedia information is the recommendation-type live channel, for example, when the live channel is a live channel of e-commerce, first multimedia information comprising recommendation information and/or prompt information may be generated, wherein the recommendation information may refer to a sales venue linked to the live channel of the e-commerce, a purchase link of a hot product in this live of the live channel of the e-commerce, or the like, and the prompt information may be basic information such as the number of viewers in the live channel of the e-commerce. For example, when the server 20 sends the first multimedia information to the terminal 21, a first page 70 shown in FIG. 7 is displayed in the terminal 21 when the live ends, in which an identification 71 corresponding to the e-commerce, first multimedia information 72, and a first identification (recommendation identification) 73 are comprised, wherein the first multimedia information 72 may set a display background, the display background may be an image or a dynamic image, and the first multimedia information 72 may further comprise title copywriting, basic data, and the like; the first identification 73 may further display text, for example, "go to venue", helping prompt the user to jump from the first identification 73 to a venue page, i.e., jump from the first page 70 to a third page 74; the third page 74 comprises a second identification 75, the second identification 75 being used for returning to the first page 70; the third page 74 may further comprise information of one or more commodities that is preset by the anchor; the third page 74 comprises information of 4 commodities in total, and the information of each commodity can be displayed in four square areas in the third page 74 for browsing and purchasing the commodity by the user, to accept residual warmth of the user viewing the live, while making the content of the live end page richer.

Figure 8:
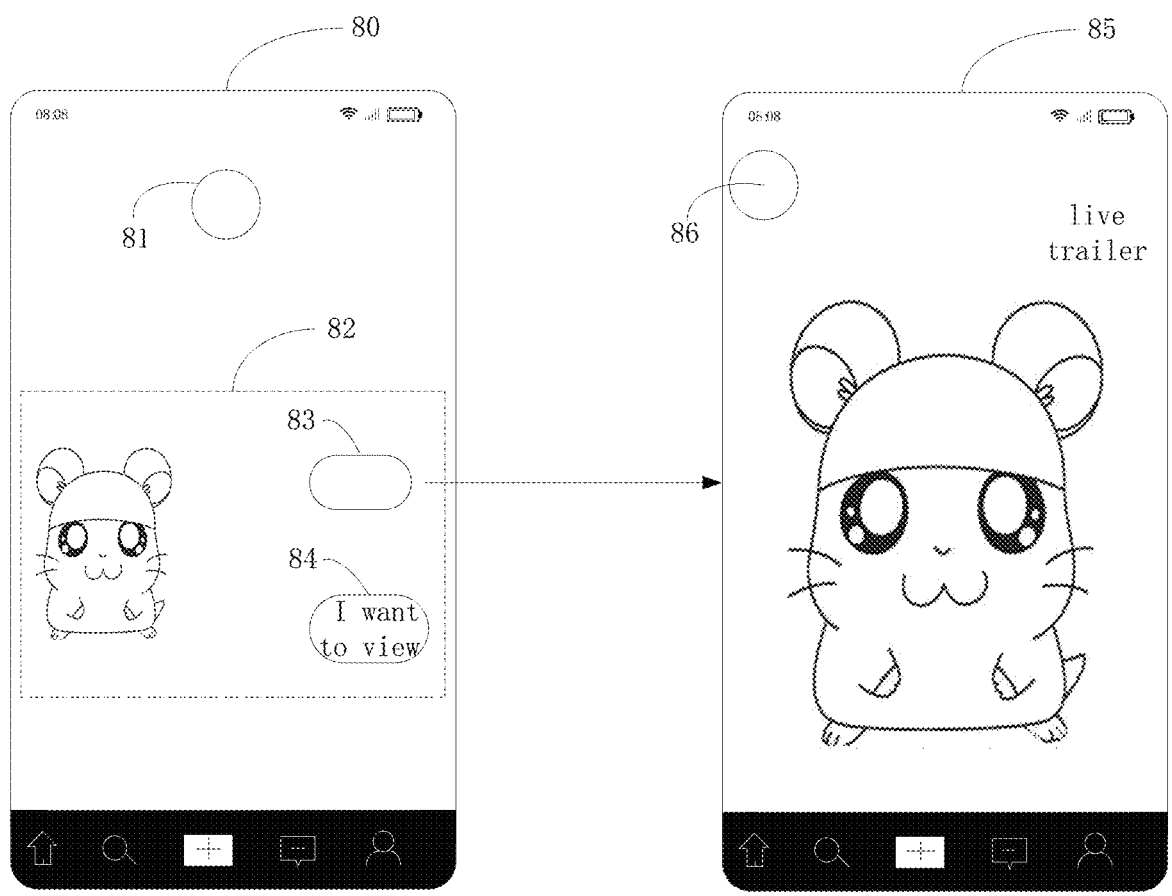
FIG. 8 is a schematic diagram of another user page in an embodiment of the present disclosure.

Understandably, when the server 20 determines that the type of the live multimedia information is the guidance-type live channel, for example, when the live channel is a paid live channel, first multimedia information comprising guidance information and/or prompt information may be generated, that is, the first multimedia information may comprise both the guidance information and the prompt information, or may comprise only the guidance information or the prompt information, the guidance information referring to a trailer video of a next live of the paid live channel or a replay video of the paid live channel. When the paid live channel is specifically a trailer live channel, the anchor can set the first multimedia information by himself, for example, the first multimedia information comprises a trailer video of a next live and a copywriting introduction to the trailer video, etc., facilitating the user understanding main content, live time, etc., of the next live, and the next live can be subscribed to, for prompting the user to view the next live before the live starts; for example, when the server 20 sends the first multimedia information to the terminal 21, a first page 80 shown in FIG. 8 is displayed in the terminal 21 when the live ends, in which an identification 81 corresponding to the anchor, first multimedia information 82, a first identification (guidance identification) 83, and a subscription identification 84 are comprised, and at this time, the guidance-type live channel will comprise a guidance signal, the guidance signal comprising the guidance identification; in the first multimedia information 81, the avatar of the anchor can be taken as a cover, or a cover is set by the anchor himself, or a wonderful picture is captured in the live as a cover picture; the first multimedia information 82 can also provide introduction of the content of the next live, for example, displaying "Next live: ****", or displaying the next live time, for example, "Starting at 20:00 on *month *day", and other text information; the first identification 83 is used for identifying the first multimedia information 82; when a trigger operation for the first identification 83 is detected, a third page 85 is displayed, the third page 85 being used for displaying the first multimedia information 82, that is, playing the first multimedia information 82; the subscription identification 84 is used for subscribing to the next live, and the subscription identification 84 may also be configured with text, such as "I want to view" and the like.

Understandably, when the server 20 identifies that the type of the live video information is the basic-type live channel, that is, the type of the live channel playing a live is a basic live channel, first multimedia information comprising prompt information may be generated, wherein the prompt information may be information such as an accumulated number of viewers of the live, the user's contribution in this live, and the user's ranking in a list of this live, and the specific display content of the prompt information may be set by the user himself, so that it will not be repeated herein.

Optionally, the first page further comprises a recommendation area in which at least one recommendation identification is comprised; after the sending the first multimedia information to a client, so that a first page, which is displayed by the client upon an end of a live of the live channel, comprises the first multimedia information, a trigger operation for the recommendation identification is detected, and second multimedia information associated with the recommendation identification is sent to the client, so that the client displays the second multimedia information.

Understandably, after detecting the trigger operation for the recommendation identification, the terminal 21 generates trigger information and sends the trigger information to the server 20, so that the server 20 detects the trigger operation for the recommendation identification and sends the second multimedia information associated with the recommendation identification to the client, so that the client displays the second multimedia information.

For example, the first page may be divided into 3 areas, the number of the divided areas and distribution of the areas being not limited, wherein a first area is an anchor information area, for displaying basic information of the anchor, such as the name and avatar of the anchor, a second area is a display content area, for displaying the first multimedia information, a third area is a recommendation area, for displaying recommended live channel information; the recommendation area comprises at least one recommendation identification, that is, the recommendation area comprises at least one of second multimedia information, each recommendation identification being associated with one of second multimedia information; the second multimedia information refers to information related to the recommended live channel, which may comprise a cover, live content introduction, link, and the like of the recommended live channel, so that the recommendation identification may be understood as an identification for playing the second multimedia information.

Figure 9:
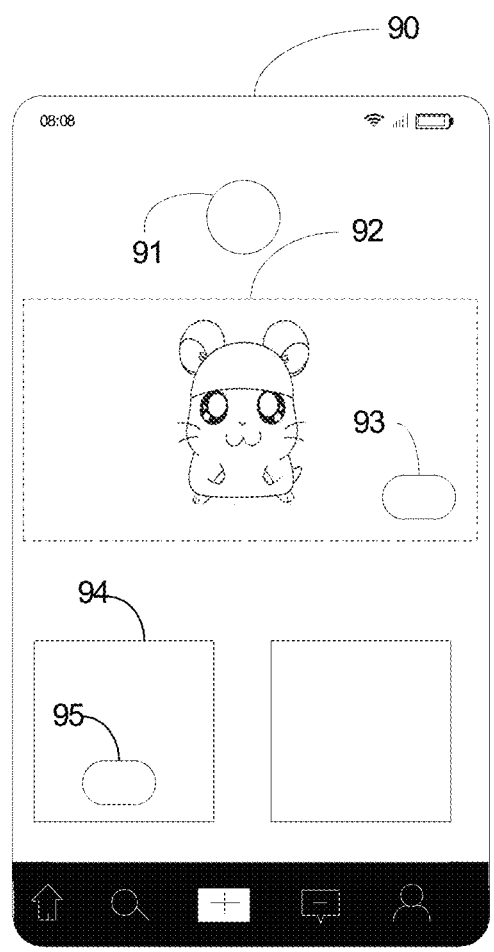
FIG. 9 is a schematic diagram of another user page in an embodiment of the present disclosure.
Figure 10:
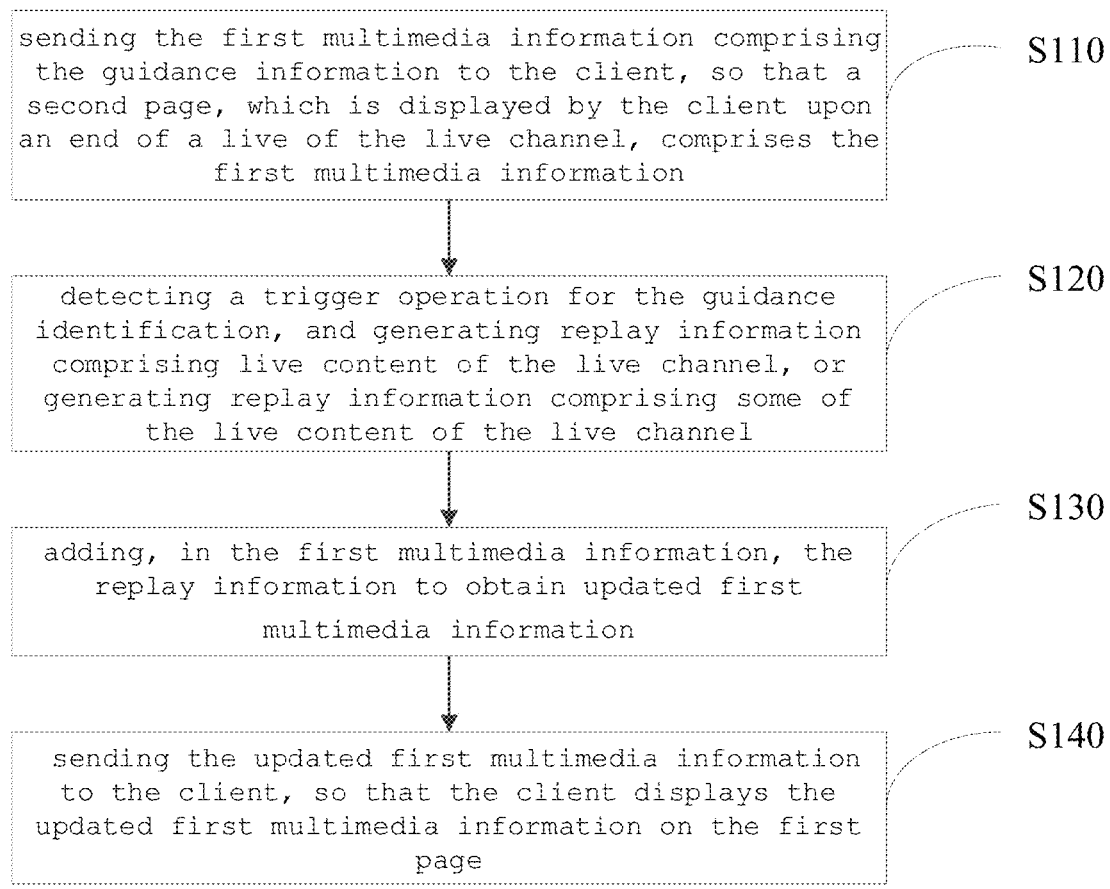
FIG. 10 is a flow diagram of another multimedia information processing method in an embodiment of the present disclosure.

For example, referring to a first page 90 in FIG. 9, the first page 90 comprises an identification 91 corresponding to the anchor in the anchor information area, first multimedia information 92 in the display content area, a first identification 93, and second multimedia information and 2 recommendation identifications corresponding to 2 recommended live channels which are comprised in the recommendation area, wherein second multimedia information corresponding to a first recommended live channel in the recommendation area is denoted as 94, and a recommendation identification associated with the second multimedia information 94 is denoted as 95; after the terminal 21 detects a trigger operation for the recommendation identification 95, the second multimedia information 94 is displayed in the second page, at this time, it jumps into the live channel corresponding to the second multimedia information 94, and the second page where the second multimedia information 94 is displayed may also be configured with a second identification (return identification), and by triggering the second identification, it returns to the first page 90. It can be understood that, the live channel corresponding to the first page is in one live stream, when the user swipes the first page up and down, he leaves the first page and enters a previous or next live channel of this live, and the live channels switched by the swipe up/down operation are in the one live stream; when the user triggers the recommendation identification in the recommendation area of the first page, leaves the first page and enters a new live channel to view a live, that is, when the user enters a new live stream logic, at this time, a live channel entered by performing the swipe up/down operation is different from the live channel entered by performing swipe up/down based on the first page, that is, it switches into a new live stream.

According to the multimedia information processing method provided in the embodiment of the present disclosure, a type of a live channel is identified, first multimedia information is generated according to the identified type of the live channel, that is, first multimedia information generated by a different type of live channel is different, and the generated first multimedia information is sent to a client, so that a first page, which is displayed by the client upon an end of a live of the live channel, comprises the first multimedia information, wherein the first page can be understood as a live end page. With the method provided in the present disclosure, the corresponding first multimedia information can be generated according to the type of the live channel, and when the live ends, the user can select to know the first multimedia information related to the live on the live end page, so that the displayed content is rich, interesting viewing content is provided for the user, and the implementation is convenient, improving the user experience.

On the basis of the above embodiment, the above S103 of sending the first multimedia information to a client, so that a first page, which is displayed by the client upon an end of a live of the live channel, comprises the first multimedia information, specifically comprises steps S110 to S140 as described below.

Understandably, a scenario realized in the steps S110 to S140 is: when the type of the live channel is the guidance-type live channel, for example, a paid live channel, which specifically may be a concert live, at this time, first multimedia information comprising guidance information and/or prompt information may be generated.

S110, sending the first multimedia information comprising the guidance information to the client, so that a second page, which is displayed by the client upon an end of a live of the live channel, comprises the first multimedia information.

Understandably, the server 20 sends the first multimedia information comprising the guidance information to the client, and the client receives the first multimedia information, and the second page which is displayed when the live ends, comprises the first multimedia information, that is, the second page comprises the guidance information.

Figure 11:
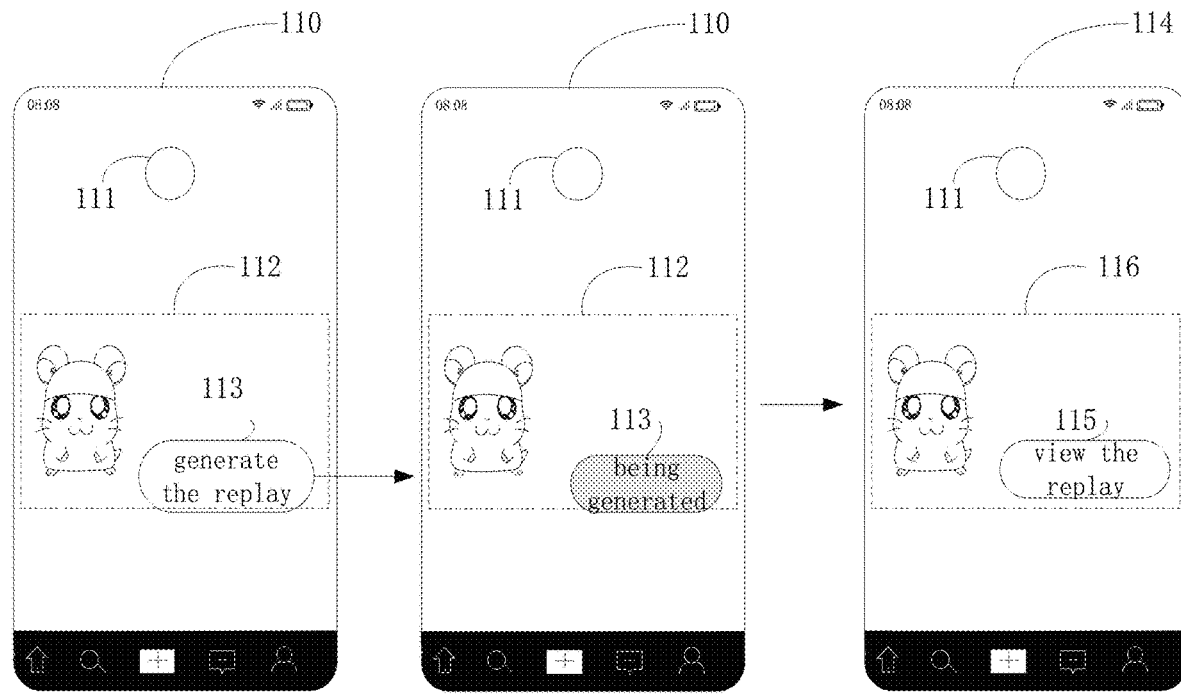
FIG. 11 is a schematic diagram of another user page in an embodiment of the present disclosure.

For example, referring to a second page 110 in FIG. 11, the second page 110 comprises an identification 111 corresponding to the anchor, first multimedia information 112, and a guidance identification 113; if the generated first multimedia information comprises guidance information, at this time, the first multimedia information 112 may display a cover, copywriting, and a guidance identification 113, wherein the copywriting may be "wonderful replay of this live", and the guidance identification 113 may be understood as a generation identification for generating the wonderful replay, and the guidance identification 113 may also display text information "generate replay", facilitating the user operation.

S120, detecting a trigger operation for the guidance identification, and generating replay information comprising the live content of the live channel, or generating replay information comprising some of the live content of the live channel.

Understandably, on the basis of the above S110, after detecting the trigger operation for the guidance identification, the terminal 21 generates the trigger information and sends the trigger information to the server 20, so that the server 20 detects the trigger operation for the guidance identification, and generates the replay information comprising the live content of the live channel, or generates the replay information comprising some of the live content of the live channel.

For example, on the basis of the above S110, referring to the second page 110 in FIG. 11, after the trigger operation for the guidance identification 113 is detected, the copywriting displayed in the first multimedia information 112 may be changed to "the wonderful replay of this live is being generated, please wait", for representing the ongoing operation process, while the guidance identification 113 may also display text information "being generated"; at this time, a background color of the guidance identification 113 may also be gray, so that in the process of replay generation, the guidance identification 113 cannot be triggered.

S130, adding, in the first multimedia information, the replay information to obtain updated first multimedia information.

Understandably, on the basis of the above S120, after the replay information is generated, the replay information is added in the first multimedia information to obtain the updated first multimedia information.

S140, sending the updated first multimedia information to the client, so that the client displays the updated first multimedia information on the first page.

For example, referring to the second page 110 in FIG. 11, after the replay information is added in the first multimedia information 112, the guidance identification is updated according to the guidance identification 113, the updated guidance identification may be understood as a play identification of the replay information, then a first page 114 is generated according to the updated guidance identification and the first multimedia information added with the replay information, and the first page 114 is displayed, the first page 114 comprises the updated guidance identification 115 and the first multimedia information 116, the updated guidance identification 115 may display content "view the replay", and at this time, the updated guidance identification 115 may be clicked to jump to the third page to view the first multimedia information 116.

Optionally, the recommendation information has a higher priority than the guidance information, and the guidance information has a higher priority than the prompt information.

Optionally, the generating, according to the type of the live channel, first multimedia information corresponding to the live channel, comprises: when the type of the live channel is the recommendation-type live channel, preferentially generating first multimedia information comprising the recommendation information; and when the type of the live multimedia information is the guidance-type live channel, preferentially generating first multimedia information comprising the guidance information.

Understandably, in the above display content area, that is, in the first multimedia information display area, the recommendation information, guidance information, or prompt information may be displayed, wherein the recommendation information has a higher priority than the guidance information, and the guidance information has a higher priority than the prompt information. When the type of the live channel is the recommendation-type live channel (program or e-commerce live channel), the first multimedia information comprising recommendation information is preferentially generated, the recommendation information and the prompt information can exist simultaneously, the recommendation information has a higher priority than the prompt information, so that when generation conditions of both the recommendation information and the prompt information are met, the recommendation information is preferentially generated; when the generated recommendation information breaks down, it can also be understood that when the recommendation information cannot be opened, the prompt information can be displayed, and the cover of the live channel can be directly displayed. Similarly, when the type of the live multimedia information is the guidance-type live channel (trailer or paid live channel), the first multimedia information comprising the guidance information is preferentially generated. Understandably, the first multimedia information corresponding to each type of live channel may also be set by the user himself, for example, the first multimedia information corresponding to the recommendation-type live channel might also comprise the guidance information, recommendation information, and prompt information at the same time.

Optionally, the prompt information comprises at least one of the number of viewers of the live multimedia information, a contribution value corresponding to a user viewing the live multimedia information, or a contribution ranking of the user.

Understandably, the number of viewers of the live multimedia information is an accumulated number of viewers of the live channel, and the contribution value corresponding to the user viewing the live multimedia information is a contribution value corresponding to the user in this live, for example, when the user gives a like, makes a comment, rewards the anchor or purchases a commodity in the live channel, a contribution value will be generated; a sum of the contribution values generated in the above mentioned situations can be calculated as the contribution value corresponding to the user in this live, and the contribution ranking of the user is a ranking of the contribution values of all the viewing users in this live.

Optionally, the generating, according to the type of the live multimedia information, first multimedia information corresponding to the live multimedia information, comprises: according to the type of the live multimedia information, if it is determined that the first multimedia information comprising the prompt information is to be generated, determining the number of the viewers and the contribution value; and generating, according to the number of the viewers and the contribution value, the first multimedia information.

Optionally, the generating, according to the number of viewers and the contribution value, the first multimedia information, specifically comprises: if the contribution value is greater than a first preset threshold, determining, according to the contribution value, the contribution ranking of the user; if the contribution ranking is greater than a second preset threshold, generating first multimedia information comprising the number of viewers and the contribution ranking; and if the contribution ranking is less than or equal to a second preset threshold, generating first multimedia information comprising the number of the viewers and the contribution value.

Understandably, according to the type of the live multimedia information, if it is determined that the first multimedia information comprising the prompt information is to be generated, the type of the live channel may be the basic-type live channel (basic live channel), or the recommendation-type live channel and the guidance-type live channel; for the recommendation-type live channel and the guidance-type live channel, it is preset that the prompt information is to be displayed, that is, the recommendation information and the prompt information are simultaneously displayed, or the guidance information and the prompt information are simultaneously displayed, so that at this time, the terminal 21 may determine that the first multimedia information comprising the prompt information is to be generated, and determine the accumulated number of the viewers and the contribution value corresponding to the user corresponding to the terminal 21 in this live when the live ends, and then if the contribution value is greater than the first preset threshold, which may be set to 0, that is, when the user makes a contribution in this live, the contribution ranking of the user in this live is determined; if the contribution ranking is less than or equal to the second preset threshold, which may be 3, that is, when the contribution ranking of the user is in the top 3, the first multimedia information comprising the accumulated number of the viewers and the contribution ranking of the user is generated, for example, in the first multimedia information, text "the accumulated number of the viewers in this live is , my ranking in this live list is 3" is displayed; if the contribution ranking is greater than the second preset threshold, that is, the user contribution ranking is not in the top 3, first multimedia information comprising the accumulated number of viewers and the user contribution value is generated, for example, text "the accumulated number of the viewers in this live is , my contribution in this live is **" is displayed; and if the contribution value corresponding to the user in this live is less than the first preset threshold, that is, when the user does not make a contribution, first multimedia information comprising only the accumulated number of the viewers can be generated. Specifically, the first preset threshold and the second preset threshold may be set by the user himself according to the user requirement.

According to the multimedia information processing method provided in the embodiment of the present disclosure, the generated first multimedia information comprising the guidance information is sent to the client; if the guidance information specifically refers to replay information, at this time, the first multimedia information will comprise information related to the replay, the terminal can display a second page first, the second page comprises a guidance identification and the first multimedia information, the guidance identification being used for generating the replay information according to the live content; specifically, if the user presses the guidance identification, the server connected with the client will generate replay information corresponding to the live content, i.e., comprising the whole live content, or generate replay information corresponding to some information in the live content, i.e., generating replay information only according to the wonderful content in the live content; the replay information is added in the above generated first multimedia information, because the replay information can only be generated after the live ends, there is not the replay information in the first multimedia information pre-generated, and therefore, the user can select whether to generate the replay information or not, and send the first multimedia information added with the replay information to the client, which can facilitate the user reviewing the live content; if a certain video in the live is missed, the video can be continued viewing according to the replay information, and wonderful content can also be provided to the user, for facilitating the implementation and having good user experience.

Figure 12:
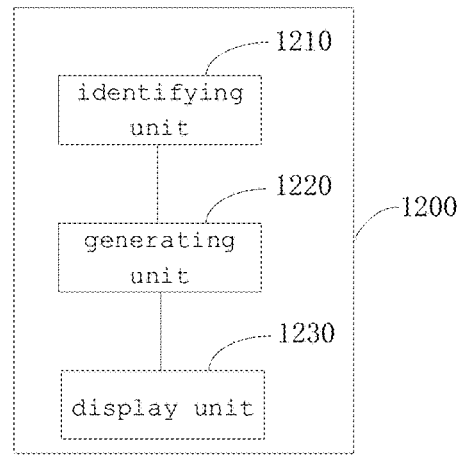
FIG. 12 is a schematic structural diagram of a multimedia information processing apparatus according to an embodiment of the present disclosure.

On the basis of the above embodiments, referring to FIG. 12, an embodiment of the present disclosure provides a multimedia information processing apparatus 1200, which specifically comprises:

an identifying unit 1210 configured to identify a type of a live channel;

a generating unit 1220 configured to generate, according to the type of the live channel, first multimedia information corresponding to the live channel; and a display unit 1230 configured to send the first multimedia information to a client, so that a first page, which is displayed by the client upon an end of a live of the live channel, comprises the first multimedia information.

Optionally, in the identifying unit 1210, the identifying a type of a live channel, comprises:

obtaining a label corresponding to the live channel; and determining, according to the label corresponding to the live channel, the type of the live channel.

Optionally, in the apparatus 1200, the type of the live channel comprises a recommendation-type live channel, a guidance-type live channel, and a basic-type live channel.

Optionally, in the apparatus 1200, the first multimedia information comprises at least one of recommendation information, guidance information, or prompt information.

Optionally, in the apparatus 1200, when the type of the live channel is the recommendation-type live channel, the first multimedia information comprises the recommendation information and/or the prompt information, the recommendation information comprising an image, a title, and a recommendation identification;

when the type of the live channel is the guidance-type live channel, the first multimedia information comprises the guidance information and/or the prompt information, the guidance information comprising a video, an image, and a guidance identification; and when the type of the live channel is the basic-type live channel, the first multimedia information comprises the prompt information.

Optionally, in the apparatus 1200, the recommendation information has a higher priority than the guidance information, and the guidance information has a higher priority than the prompt information.

Optionally, in the generating unit 1220, the generating, according to the type of the live channel, first multimedia information corresponding to the live channel, is specifically configured to:

when the type of the live channel is the recommendation-type live channel, preferentially generate first multimedia information comprising the recommendation information; and when the type of the live channel is the guidance-type live channel, preferentially generate first multimedia information comprising the guidance information.

Optionally, in the display unit 1230, the sending the first multimedia information to a client, so that a first page, which is displayed by the client upon an end of a live of the live channel, comprises the first multimedia information, comprises:

sending the first multimedia information comprising the guidance information to the client, so that a second page, which is displayed by the client upon an end of a live of the live channel, comprises the first multimedia information;

detecting a trigger operation for the guidance identification, and generating replay information comprising live content in the live channel, or generating replay information comprising some of the live content in the live channel;

adding, in the first multimedia information, the replay information to obtain updated first multimedia information; and sending the updated first multimedia information to the client, so that the client displays the updated first multimedia information on the first page.

Optionally, in the apparatus 1200, the prompt information comprises at least one of the number of viewers of the live channel, a contribution value corresponding to a user viewing the live channel, or a contribution ranking of the user.

Optionally, in the generating unit 1220, the generating, according to the type of the live channel, first multimedia information corresponding to the live channel, is specifically configured to:

according to the type of the live channel, if it is determined that the first multimedia information comprising the prompt information is to be generated, determine the number of the viewers and the contribution value; and generate, according to the number of the viewers and the contribution value, the first multimedia information.

Optionally, in the generating unit 1220, the generating, according to the number of the viewers and the contribution value, the first multimedia information, is specifically configured to:

if the contribution value is greater than a first preset threshold, determine the contribution ranking of the user according to the contribution value;

if the contribution ranking is less than or equal to a second preset threshold, generate first multimedia information comprising the number of the viewers and the contribution ranking; and if the contribution ranking is greater than a second preset threshold, generate first multimedia information comprising the number of the viewers and the contribution value.

Optionally, in the apparatus 1200, the first page further comprises a recommendation area, which comprises at least one recommendation identification.

Optionally, the apparatus 1200 further comprises a recommendation unit, specifically configured to, after the sending the first multimedia information to a client, so that a first page, which is displayed by the client upon an end of a live of the live channel, comprises the first multimedia information:

detect a trigger operation for the recommendation identification, and send second multimedia information associated with the recommendation identification to the client, so that the client displays the second multimedia information.

The multimedia information processing apparatus provided in the embodiment of the present disclosure may perform the steps performed by the client or the server in the multimedia information processing method provided in the method embodiment of the present disclosure, and has the beneficial effects of performing the steps, which will not be repeated here.

Figure 13:
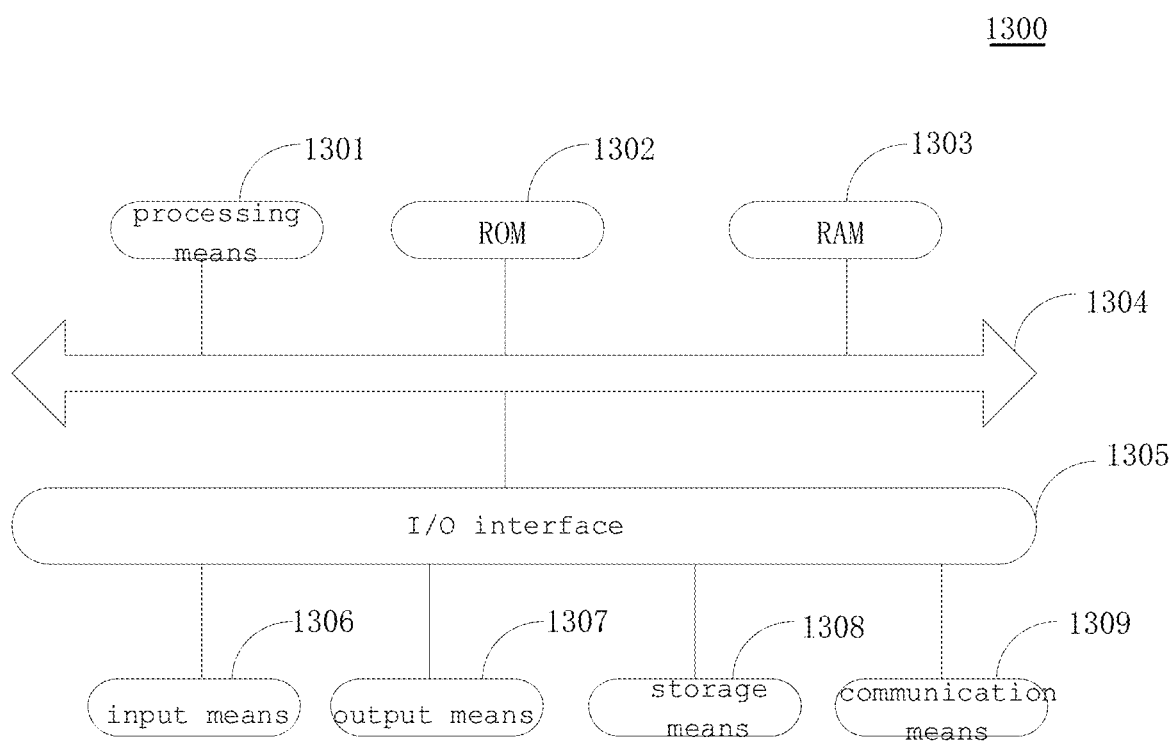
FIG. 13 is a schematic structural diagram of an electronic device in an embodiment of the present disclosure.

FIG. 13 is a schematic structural diagram of an electronic device in an embodiment of the present disclosure. Reference is specifically made below to FIG. 13, which shows a schematic structural diagram of an electronic device 1300 suitable for implementing the embodiment of the present disclosure. The electronic device 1300 in the embodiment of the present disclosure may comprise, but is not limited to, a mobile terminal such as a mobile phone, a notebook computer, a digital broadcast receiver, a PDA (Personal Digital Assistant), a PAD (tablet computer), a PMP (Portable Multimedia Player), vehicle-mounted terminal (e.g., a vehicle-mounted navigation terminal), and a wearable electronic device, and a fixed terminal, such as a digital TV, a desktop computer, and a smart home device. The electronic device shown in FIG. 13 is only an example, and should not bring any limitation to the functions and the scope of use of the embodiments of the present disclosure.

As shown in FIG. 13, the electronic device 1300 may comprise a processing means (e.g., a central processing unit, a graphics processing unit, etc.) 1301, which may perform various appropriate actions and processes according to a program stored in a read-only memory (ROM) 1302 or a program loaded from a storage means 1308 into a random access memory (RAM) 1303 to implement the multimedia information processing method according to the embodiments described in the present disclosure. In the RAM 1303, various programs and data required for the operation of the electronic device 1300 are also stored. The processing means 1301, the ROM 1302, and the RAM 1303 are connected to each other via a bus 1304. An input/output (I/O) interface 1305 is also connected to the bus 1304.

Generally, the following means may be connected to the I/O interface 1305: an input means 1306 comprising, for example, a touch screen, touch pad, keyboard, mouse, camera, microphone, accelerometer, gyroscope, etc.; an output means 1307 comprising, for example, a liquid crystal display (LCD), speaker, vibrator, etc.; the storage means 1308 comprising, for example, a magnetic tape, hard disk, etc.; and a communication means 1309. The communication means 1309 may allow the electronic device 1300 to communicate wirelessly or by wire with other devices to exchange data. While FIG. 13 illustrates the electronic device 1300 having various means, it should be understood that not all illustrated means are required to be implemented or provided. More or fewer means may be alternatively implemented or provided.

In particular, according to the embodiment of the present disclosure, the processes described above with reference to the flow diagrams may be implemented as a computer software program. For example, an embodiment of the present disclosure comprises a computer program product, the computer program product comprising a computer program carried on a non-transitory computer-readable medium, the computer program containing program code for performing the method illustrated by the flow diagrams, thereby implementing the multimedia information processing method as described above. In such an embodiment, the computer program may be downloaded and installed from a network via the communication means 1309, or installed from the storage means 1308, or installed from the ROM 1302. The computer program, when executed by the processing means 1301, performs the above functions defined in the method of the embodiments of the present disclosure.

It should be noted that the above computer-readable medium of the present disclosure may be a computer-readable signal medium or a computer-readable storage medium or any combination of the above two. The computer-readable storage medium may be, for example, but is not limited to, an electronic, magnetic, optical, electromagnetic, infrared, or semiconductor system, apparatus, or device, or any combination of the foregoing. More specific examples of the computer-readable storage medium may comprise, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer-readable storage medium may be any tangible medium containing or storing a program, wherein the program can be used by or in conjunction with an instruction execution system, apparatus, or device. However, in the present disclosure, the computer-readable signal medium may comprise a data signal propagated in baseband or as part of a carrier wave, in which computer-readable program code is carried. Such a propagated data signal may take a variety of forms, comprising, but not limited to, an electromagnetic signal, optical signal, or any suitable combination of the forgoing. The computer-readable signal medium may also be any computer-readable medium other than the computer-readable storage medium, wherein the computer-readable signal medium can send, propagate, or transmit a program for use by or in conjunction with an instruction execution system, apparatus, or device. The program code contained on the computer-readable medium may be transmitted using any appropriate medium, comprising but not limited to: a wire, an optical cable, RF (Radio Frequency), etc., or any suitable combination of the foregoing.

In some embodiments, a client and a server may communicate using any currently known or future developed network protocol, such as HTTP (HyperText Transfer Protocol), and may be interconnected with any form or medium of digital data communication (e.g., a communication network). Examples of the communication network comprise a local area network ("LAN"), a wide area network ("WAN"), an internet (e.g., the Internet), and a peer-to-peer network (e.g., an ad hoc peer-to-peer network), as well as any currently known or future developed network.

The above computer-readable medium may be contained in the above electronic device; or may exist separately without being assembled into the electronic device.

The above computer-readable medium has one or more programs carried thereon, which, when executed by the electronic device, cause the electronic device to:
identify a type of a live channel;
generate, according to the type of the live channel, first multimedia information corresponding to the live channel; and
send the first multimedia information to a client, so that a first page, which is displayed by the client upon an end of a live of the live channel, comprises the first multimedia information.

Optionally, when the above one or more programs are executed by the electronic device, the electronic device may also perform other steps according to the above embodiment.

Computer program code for performing the operation of the present disclosure may be written in one or more programming languages or a combination thereof, wherein the above programming language comprises but is not limited to an object-oriented programming language such as Java, Smalltalk, and C++, and also comprises a conventional procedural programming language, such as a "C" language or a similar programming language. The program code may be executed entirely on a user's computer, partly on the user's computer, as a stand-alone software package, partly on the user's computer and partly on a remote computer, or entirely on the remote computer or server. In a scenario where the remote computer is involved, the remote computer may be connected to the user's computer through any type of network, comprising a local area network (LAN) or a wide area network (WAN), or may be connected to an external computer (for example, through the Internet using an Internet service provider).

The flow diagrams and block diagrams in the drawings illustrate the possibly implemented architecture, functions, and operations of the system, method and computer program product according to various embodiments of the present disclosure. In this regard, each block in the flow diagrams or block diagrams may represent a module, program segment, or part of code, which comprises one or more executable instructions for implementing a specified logical function. It should also be noted that, in some alternative implementations, functions noted in blocks may occur in a different order from those noted in the drawings. For example, two blocks shown in succession may, in fact, be executed substantially concurrently, or they may sometimes be executed in a reverse order, which depends upon the functions involved. It will also be noted that each block in the block diagrams and/or flow diagrams, and a combination of the blocks in the block diagrams and/or flow diagrams, can be implemented by a special-purpose hardware-based system that performs specified functions or operations, or a combination of special-purpose hardware and computer instructions.

The involved unit described in the embodiments of the present disclosure may be implemented by software or hardware. The name of the unit does not, in some cases, constitute a limitation on the unit itself.

The functions described above herein may be executed, at least partially, by one or more hardware logic components. For example, without limitation, a hardware logic component of an exemplary type that may be used comprises: a field programmable gate array (FPGA), an application specific integrated circuit (ASIC), an application specific standard parts (ASSP), a system on chip (SOC), a complex programmable logic device (CPLD), and the like.

In the context of this disclosure, a machine-readable medium may be a tangible medium, which can contain or store a program for use by or in conjunction with an instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combination of the foregoing. More specific examples of the machine-readable storage medium comprise an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

According to one or more embodiments of the present disclosure, there is provided a multimedia information processing method, comprising:
identifying a type of a live channel;
generating, according to the type of the live channel, first multimedia information corresponding to the live channel; and
sending the first multimedia information to a client, so that a first page, which is displayed by the client upon an end of a live of the live channel, comprises the first multimedia information.

The identifying a type of a live channel comprises:
obtaining a label corresponding to the live channel; and
determining, according to the label corresponding to the live channel, the type of the live channel.

The type of the live channel comprises a recommendation-type live channel, a guidance-type live channel, and a basic-type live channel.

The first multimedia information comprises at least one of recommendation information, guidance information, or prompt information,
when the type of the live channel is the recommendation-type live channel, the first multimedia information comprises the recommendation information and/or the prompt information, the recommendation information comprising an image, a title and a recommendation identification;
when the type of the live channel is the guidance-type live channel, the first multimedia information comprises the guidance information and/or the prompt information, the guidance information comprising a video, an image and a guidance identification; and when the type of the live channel is the basic-type live channel, the first multimedia information comprises the prompt information.

The recommendation information has a higher priority than the guidance information, and the guidance information has a higher priority than the prompt information; and the generating, according to the type of the live channel, first multimedia information corresponding to the live channel, comprises:

when the type of the live channel is the recommendation-type live channel, preferentially generating first multimedia information comprising the recommendation information; and when the type of the live channel is the guidance-type live channel, preferentially generating first multimedia information comprising the guidance information.

The sending the first multimedia information to a client, so that a first page, which is displayed by the client upon an end of a live of the live channel, comprises the first multimedia information, comprises:

sending the first multimedia information comprising the guidance information to the client, so that a second page, which is displayed by the client upon an end of a live of the live channel, comprises the first multimedia information;

detecting a trigger operation for the guidance identification, and generating replay information comprising live content of the live channel, or generating replay information comprising some of the live content of the live channel;

adding, in the first multimedia information, the replay information to obtain updated first multimedia information; and sending the updated first multimedia information to the client, so that the client displays the updated first multimedia information on the first page.

The prompt information comprises at least one of the number of viewers of the live channel, a contribution value corresponding to a user viewing the live channel, or a contribution ranking of the user.

The generating, according to the type of the live channel, first multimedia information corresponding to the live channel, comprises:

according to the type of the live channel, if it is determined that the first multimedia information comprising the prompt information is to be generated, determining the number of the viewers and the contribution value; and generating, according to the number of the viewers and the contribution value, the first multimedia information.

The generating, according to the number of the viewers and the contribution value, the first multimedia information, comprises:

if the contribution value is greater than a first preset threshold, determining, according to the contribution value, the contribution ranking of the user;

if the contribution ranking is less than or equal to a second preset threshold, generating first multimedia information comprising the number of the viewers and the contribution ranking; and if the contribution ranking is greater than the second preset threshold, generating first multimedia information comprising the number of the viewers and the contribution value.

The first page further comprises a recommendation area, which comprises at least one recommendation identification; and after the sending the first multimedia information to a client, so that a first page, which is displayed by the client upon an end of a live of the live channel, comprises the first multimedia information, the method further comprises:

detecting a trigger operation for the recommendation identification, and sending second multimedia information associated with the recommendation identification to the client, so that the client displays the second multimedia information.

According to one or more embodiments of the present disclosure, there is provided a multimedia information processing apparatus, comprising:

an identifying unit configured to identify a type of a live channel;

a generating unit configured to generate, according to the type of the live channel, first multimedia information corresponding to the live channel; and a display unit configured to send the first multimedia information to a client, so that a first page, which is displayed by the client upon an end of a live of the live channel, comprises the first multimedia information.

The units described above may be implemented as software components executed on one or more general-purpose processors, or as hardware executing certain functions or combinations thereof, such as a programmable logic device and/or application specific integrated circuit. In some embodiments, these modules may be embodied in a form of a software product, which may be stored in non-volatile storage media comprising instructions that cause a computer device (e.g., a personal computer, server, network device, mobile terminal, etc.) to implement the method described in the embodiment of the present disclosure. In other embodiments, the above units may also be implemented on a single device or may be distributed on a plurality of devices. Functions of these units may be combined with each other, or further divided into a plurality of sub-modules.

According to one or more embodiments of the present disclosure, there is provided an electronic device, comprising:

one or more processors; and a memory configured to store one or more programs;

the one or more programs, when executed by the one or more processors, cause the one or more processors to implement any of the multimedia information processing methods according to the present disclosure.

According to one or more embodiments of the present disclosure, there is provided a computer-readable storage medium having thereon stored a computer program which, when executed by a processor, implements any of the multimedia information processing methods according to the present disclosure.

An embodiment of the present disclosure further provides a computer program product comprising a computer program or instructions which, when executed by a processor, implement the multimedia information processing method as described above.

The foregoing description is only the preferred embodiments of the present disclosure and an explanation of the technical principles employed. It should be appreciated by those skilled in the art that the disclosure scope involved in the present disclosure is not limited to the technical solutions formed by specific combinations of the technical features described above, but also encompasses other technical solutions formed by arbitrary combinations of the above technical features or equivalent features thereof without departing from the above disclosed concepts, for example, a technical solution formed by performing mutual replacement between the above features and technical features having similar functions to those disclosed (but not limited to) in the present disclosure.

Furthermore, while operations are depicted in a specific order, this should not be understood as requiring that these operations be performed in the specific order shown or in a sequential order. Under certain circumstances, multitasking and parallel processing might be advantageous. Similarly, while several specific implementation details are comprised in the above discussion, these should not be construed as limitations on the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in language specific to structural features and/or method logical actions, it should be understood that the subject matter defined in the attached claims is not necessarily limited to the specific features or actions described above. Rather, the specific features and actions described above are only example forms of implementing the claims.

What is claimed is:

1. A multimedia information processing method, comprising:
    identifying a type of a live stream;
    generating, according to the type of the live stream, first multimedia information corresponding to the live stream;
    sending the first media information to a client so that a first page, which is displayed by the client upon an end of a live of the live stream, comprises the first multimedia information;
    in response to the type of the live stream being a recommendation-type live stream, the first media information comprises at least one of recommendation information or prompt information; and
    in response to the type of the live stream being a guidance-type live stream, the first media information comprises at least one of guidance information or the prompt information.

2. The media information processing method according to claim 1, wherein the identifying a type of a live stream comprises:
    obtaining a label corresponding to the live stream; and
    determining, according to the label corresponding to the live stream, the type of the live stream.

3. The media information processing method according to claim 1, wherein the recommendation information comprises an image, a title and a recommendation identification, wherein the guidance information comprises a video, an image and a guidance identification, and wherein the media information processing method further comprises:
    in response to the type of the live stream being a basic-type live stream, the first media information comprises the prompt information.

4. The media information processing method according to claim 1, wherein the recommendation information has a higher priority than the guidance information, and the guidance information has a higher priority than the prompt information.

5. The media information processing method according to claim 4, wherein the generating, according to the type of the live stream, first media information corresponding to the live stream, comprises:
    in response to the type of the live stream being the recommendation-type live stream, preferentially generating first media information comprising the recommendation information; and
    in response to the type of the live stream being the guidance-type live stream, preferentially generating first media information comprising the guidance information.

6. The media information processing method according to claim 1, wherein the sending the first media information to a client so that a first page, which is displayed by the client upon an end of a live of the live stream, comprises the first media information, comprises:
    sending the first media information comprising the guidance information to the client, so that a second page, which is displayed by the client upon an end of a live of the live stream, comprises the first media information;
    detecting a trigger operation for the guidance identification, and generating replay information comprising live content of the live stream, or generating replay information comprising part of the live content of the live stream,
    adding, in the first media information, the replay information to obtain updated first media information; and
    sending the updated first media information to the client, so that the client displays the updated first media information on the first page.

7. The media information processing method according to claim 1, wherein the prompt information comprises at least one of a number of viewers of the live stream, a contribution value corresponding to a user viewing the live stream, or a contribution ranking of the user.

8. The media information processing method according to claim 7, wherein the generating, according to the type of the live stream, first multimedia information corresponding to the live stream, comprises:
    according to the type of the live stream, in response to determining that the first media information comprising the prompt information is to be generated, determining the number of the viewers and the contribution value; and
    generating, according to the number of the viewers and the contribution value, the first media information.

9. The media information processing method according to claim 8, wherein the generating, according to the number of the viewers and the contribution value, the first media information, comprises:
    in response to the contribution value being greater than a first preset threshold, determining, according to the contribution value, the contribution ranking of the user;
    in response to the contribution ranking being less than or equal to a second preset threshold, generating first media information comprising the number of the viewers and the contribution ranking; and
    in response to the contribution ranking being greater than the second preset threshold, generating first media information comprising the number of the viewers and the contribution value.

10. The media information processing method according to claim 1, wherein the first page further comprises a recommendation area, which comprises at least one recommendation identification; and the media information processing method further comprises, after the sending the first media information to a client, so that a first page, which is displayed by the client upon an end of a live of the live stream, comprises the first media information:
  detecting a trigger operation for the recommendation identification, and sending second media information associated with the recommendation identification to the client, so that the client displays the second media information.

11. The media information processing method according to claim 1, wherein the generating, according to the type of the live stream, first multimedia information corresponding to the live stream, comprises:
  pre-configuring at least one generation template of the first media information for each type of live stream; and
  generating, according to the type of the live stream, the first media information by using the at least one generation template of the first multimedia information.

12. The media information processing method according to claim 1, wherein first media information generated according to different types of live stream s are different.

13. An electronic device, comprising:
  one or more processors; and
  storage means configured to store one or more programs, wherein the one or more programs, when executed by the one or more processors, cause the one or more processors to implement operations comprising:
  identifying a type of a live stream;
  generating, according to the type of the live stream, first media information corresponding to the live stream;
  sending the first media information to a client so that a first page, which is displayed by the client upon an end of a live of the live stream, comprises the first media information;
  in response to the type of the live stream being a recommendation-type live stream, the first media information comprises at least one of recommendation information or prompt information; and
  in response to the type of the live stream being a guidance-type live stream, the first media information comprises at least one of guidance information or the prompt information.

14. The electronic device according to claim 13, wherein the identifying a type of a live stream comprises:
  obtaining a label corresponding to the live stream channel; and
  determining, according to the label corresponding to the live stream, the type of the live stream.

15. The electronic device according to claim 13, wherein the recommendation information has a higher priority than a guidance information, and the guidance information has a higher priority than the prompt information.

16. The electronic device according to claim 13, wherein the sending the first media information to a client comprises:

sending the first media information comprising the guidance information to the client so that a second page, which is displayed by the client upon an end of a live of the live stream, comprises the first media information;
  detecting a trigger operation for the guidance identification, and generating replay information comprising live content of the live stream, or generating replay information comprising part of the live content of the live stream;
  adding, in the first media information, the replay information to obtain updated first media information; and
  sending the updated first media information to the client, so that the client displays the updated first media information on the first page.

17. A non-transitory computer-readable storage medium having thereon stored a computer program which, when executed by a processor, implements operations comprising:
  identifying a type of a live stream;
  generating, according to the type of the live stream, first multimedia information corresponding to the live stream;
  sending the first media information to a client so that a first page, which is displayed by the client upon an end of a live of the live stream, comprises the first multimedia information;
  in response to the type of the live stream being a recommendation-type live stream, the first media information comprises at least one of recommendation information or prompt information; and
  in response to the type of the live stream being a guidance-type live stream, the first media information comprises at least one of guidance information or the prompt information.

18. The non-transitory computer-readable storage medium according to claim 17, wherein the identifying a type of a live stream comprises:
  obtaining a label corresponding to the live stream; and
  determining, according to the label corresponding to the live stream, the type of the live stream.

19. The non-transitory computer-readable storage medium according to claim 17, wherein the recommendation information comprises an image, a title and a recommendation identification, wherein the guidance information comprises a video, an image and a guidance identification, and wherein the operations further comprises:
  in response to the type of the live stream being a the basic-type live stream, the first multimedia information comprises the prompt information.

20. The non-transitory computer-readable storage medium according to claim 17, wherein the recommendation information has a higher priority than the guidance information, and the guidance information has a higher priority than the prompt information.

* * * * *